US012143753B2

(12) United States Patent
Schwartz et al.

(10) Patent No.: US 12,143,753 B2
(45) Date of Patent: *Nov. 12, 2024

(54) REMOTE ACCESS TO PERSONAL VIDEO PROFILE

(71) Applicant: COMCAST CABLE COMMUNICATIONS MANAGEMENT, LLC, Philadelphia, PA (US)

(72) Inventors: Samuel Schwartz, Penn Valley, PA (US); Bruce Hertzfeld, Narbeth, PA (US); Eric Budin, Rosemont, PA (US)

(73) Assignee: Comcast Cable Communications Management, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/711,392

(22) Filed: Sep. 21, 2017

(65) Prior Publication Data
US 2018/0234663 A1 Aug. 16, 2018

Related U.S. Application Data

(63) Continuation of application No. 12/104,031, filed on Apr. 16, 2008, now Pat. No. 9,800,839.

(51) Int. Cl.
*H04N 21/25* (2011.01)
*H04N 7/173* (2011.01)
(Continued)

(52) U.S. Cl.
CPC ....... *H04N 7/17318* (2013.01); *H04N 21/251* (2013.01); *H04N 21/25875* (2013.01);
(Continued)

(58) Field of Classification Search
CPC ....... H04N 21/25875; H04N 21/25891; H04N 21/41407; H04N 21/251; H04N 21/8166;
(Continued)

(56) References Cited

U.S. PATENT DOCUMENTS 5,861,906 A 1/1999 Dunn et al.
6,177,931 B1 * 1/2001 Alexander ....... H04N 21/44222
725/52

(Continued)

FOREIGN PATENT DOCUMENTS

EP 1187485 A1 3/2002
EP 1231788 A1 8/2002
(Continued)

OTHER PUBLICATIONS

Extended European Search Report—EP 09755560.1—Mailing Date: Mar. 27, 2014.
(Continued)

*Primary Examiner* — Hsiungfei Peng
(74) *Attorney, Agent, or Firm* — Banner & Witcoff, Ltd.

(57) ABSTRACT

A system for providing a user-specific list of programs for online viewing based on a user profile stored in a DVR of a user, said system comprising: (a) a preference server linked to a wide area network and in communication with said DVR and at least one content server having a library of programs available for online delivery to a remote device; and (b) a User Menu hosted by said preference server and particular to said user, said User Menu providing said user-specific list of programs based on said user profile stored in said DVR.

23 Claims, 2 Drawing Sheets

(51) Int. Cl.
  *H04N 21/258* (2011.01)
  *H04N 21/414* (2011.01)
  *H04N 21/45* (2011.01)
  *H04N 21/472* (2011.01)
  *H04N 21/482* (2011.01)
  *H04N 21/658* (2011.01)
  *H04N 21/81* (2011.01)

(52) U.S. Cl.
  CPC . *H04N 21/25891* (2013.01); *H04N 21/41407* (2013.01); *H04N 21/4532* (2013.01); *H04N 21/472* (2013.01); *H04N 21/4826* (2013.01); *H04N 21/6582* (2013.01); *H04N 21/8166* (2013.01)

(58) Field of Classification Search
  CPC ........... H04N 21/4826; H04N 21/6582; H04N 21/4532; H04N 21/472
  See application file for complete search history.

(56) References Cited

U.S. PATENT DOCUMENTS

| | | | |
|---|---|---|---|
| 8,181,206 B2 | 5/2012 | Hasek | |
| 8,549,563 B2* | 10/2013 | Ellis | H04N 5/76 725/58 |
| 8,713,615 B2* | 4/2014 | Angiolillo | H04N 21/4788 725/80 |
| 8,917,646 B2* | 12/2014 | Bhogal | H04N 21/4147 370/312 |
| 2002/0053081 A1 | 5/2002 | Griggs | |
| 2002/0059609 A1* | 5/2002 | Cragun | H04N 21/482 725/56 |
| 2002/0059621 A1* | 5/2002 | Thomas | H04L 67/06 725/87 |
| 2002/0174430 A1* | 11/2002 | Ellis | H04N 21/4753 386/230 |
| 2002/0184631 A1 | 12/2002 | Cezeaux et al. | |
| 2003/0018972 A1* | 1/2003 | Arora | H04N 21/4667 725/47 |
| 2003/0149980 A1 | 8/2003 | Hassell et al. | |
| 2004/0073915 A1 | 4/2004 | Dureau | |
| 2004/0117829 A1 | 6/2004 | Karaoguz et al. | |
| 2005/0002649 A1* | 1/2005 | Boyle | H04N 5/44543 386/297 |
| 2005/0028208 A1* | 2/2005 | Ellis | H04N 7/173 725/58 |
| 2005/0060743 A1 | 3/2005 | Ohnuma et al. | |
| 2005/0210524 A1 | 9/2005 | Dolph | |
| 2006/0107289 A1 | 5/2006 | DeYonker et al. | |
| 2006/0259927 A1* | 11/2006 | Acharya | H04N 21/2221 725/61 |
| 2007/0157220 A1* | 7/2007 | Cordray | H04H 60/65 725/9 |
| 2007/0186267 A1 | 8/2007 | Ohde et al. | |
| 2007/0239668 A1* | 10/2007 | Shin | G06F 16/40 |
| 2007/0276925 A1* | 11/2007 | La Joie | G06Q 30/0256 709/219 |
| 2007/0288964 A1 | 12/2007 | Horiguchi | |
| 2007/0300252 A1 | 12/2007 | Acharya et al. | |
| 2008/0155079 A1 | 6/2008 | Spiegelman | |
| 2008/0209491 A1* | 8/2008 | Hasek | H04N 7/17318 725/114 |
| 2009/0019492 A1* | 1/2009 | Grasset | G11B 27/034 725/45 |
| 2009/0077064 A1* | 3/2009 | Daigle | G06Q 10/10 |
| 2009/0113472 A1* | 4/2009 | Sheth | G06F 16/958 725/34 |
| 2009/0178078 A1* | 7/2009 | Daigle | H04N 21/4312 725/40 |
| 2009/0260038 A1* | 10/2009 | Acton | H04N 21/4263 725/49 |

FOREIGN PATENT DOCUMENTS

| | | |
|---|---|---|
| EP | 1753241 A2 | 2/2007 |
| EP | 1793604 A1 | 6/2007 |
| WO | 0115449 A1 | 3/2001 |
| WO | 03036970 A1 | 5/2003 |
| WO | 2007084793 A2 | 7/2007 |

OTHER PUBLICATIONS

European Office Action—App No. 09755560.1—dated Sep. 13, 2016.

Oct. 23, 2018—Extended European Search Report—EP 18187783.8.

Dec. 20, 2019—European Office Action—EP 18187783.8.

* cited by examiner

REMOTE ACCESS TO PERSONAL VIDEO PROFILE

CROSS-REFERENCE TO RELATED APPLICATIONS

This application is a continuation of co-pending U.S. application Ser. No. 12/104,031, which was filed on Apr. 16, 2008, and is hereby incorporated by reference in its entirety.

FIELD

The present invention relates generally to online viewing of digital content, and, more specifically, to a system and method for providing a user with a user-specific list of program choices based on user profile information stored on the user's digital video recording device (DVR).

BACKGROUND

A digital video recorder (DVR) or personal video recorder (PVR) is a device that records video in a digital format to a disk drive or other medium. The term includes stand-alone set-top boxes and software for personal computers which enables video capture and playback to and from disk. The term also includes televisions with DVR hardware and software built into the television itself.

DVRs have become very popular. One obvious reason for their popularity is the convenience they offer users in "time shifting" programs.

Specifically, DVRs allow users to schedule recordings of broadcast programs, which then can be viewed later, at a convenient time for the user.

Another perhaps less obvious reason for the popularity of DVRs is their ability to organize programming choices. Specifically, DVRs use the metadata provided in programs recorded or scheduled for recording to provide informative lists of programs available for viewing. Because the user must select the programs to be recorded, only programs of interest to the user are listed. Furthermore, more advanced DVRs allow the list to be customized according to a user's needs. For example, it may prioritize programs on the list according to those that remain unwatched, and, likewise, deemphasize or even delete those that have already been watched or make suggestions of related shows. Essentially, the DVR functions to list programs of particular interest to a user in a meaningful and helpful way.

More frequently, users are viewing programs online (i.e., over a wide area network such as the Internet). For example, when traveling or in a location where access to cable or satellite television is limited, a user may be forced or prefer to watch programs online using a remote device. As used herein, a "remote device" is any device capable of playing digital content transmitted over a wide area network such as the Internet. Typical remote devices include, for example, personal computers, cell phones, smart phones, PDAs, and TVs interfaced with a set top box suitable for connection to the Internet.

Recently, devices have been developed to transmit the programming from a user's DVR over the Internet to a remote device. One popular device for transmitting DVR content over the Internet is sold by Sling Media of San Mateo, California under the name "SlingBox". This device connects a TV source to an existing Internet connection. Software on a user's computer or remote device connects to the SlingBox and provides the user interface for viewing the video stream and changing channels. The SlingBox uploads the digital content from the DVR to a server, which then transmits the content to the remote device over the Internet.

Although this approach exploits the benefits of the DVR with respect to both time shifting and organization, the quality of these transmissions is significantly diminished. Specifically, the upstream bandwidth of a user's Internet connection is dependent on many factors, including the type of connection (e.g., cable, DSL, wireless), the Internet service providers specific configuration of the network, and network traffic at any particular time. If sufficient bandwidth is not available, which is often the case, the digital content must be truncated, thus diminishing its quality.

In addition to reduced quality, transmitting programs over the Internet from DVRs raises legal issues. Specifically, although time shifting is regarded as legally acceptable, the legality of transmitting prerecorded programs over the Internet to remote devices remains unresolved. Such online transmissions may be regarded as copyright infringement unless proper rights have been secured.

Therefore, a need exists for users to enjoy online programming while exploiting the organizational advantages of their DVRs without compromising on the quality or legality of the programs being transmitted.

SUMMARY OF INVENTION

The present invention provides a system and process for online viewing of a user-specific list of programs based on a profile of the user stored in the user's DVR. Specifically, applicants recognize that DVRs are popular not only because of their time shifting capabilities, but also because of their organization features. These organization features distinguish DVR time shifting from other types of time shifting such as video on demand (VOD) and online streaming. There are circumstances, however, in which DVR use is limited and online viewing is preferred. In such circumstances, the system of the present invention communicates with the user's DVR to obtain the user's profile, which contains viewing preferences organized in a meaningful way, and then provides this information in a User's Menu on a user's remote device via the Internet. In this way, the user has his DVR user profile and related information—such as preferences, stored programs, and entitlement (rights) to view specific content—available to make online viewing choices.

The system and method of the present invention offer significant benefits over the prior art. For example, only programs of interest to the user are displayed on the User Menu, thus simplifying the user's choices from a sea of online viewing possibilities. In addition to listing only those programs of interest to the user, the user-specific User Menu may impart the organizational features of the DVR. These organizational features may include, for example, prioritizing unwatched programs, listing the programs of a series sequentially, listing programs based on recording date, showing other programs in that series, etc. Furthermore, optionally the system can interact with an online content server to list only those programs from the user profile that are available for online viewing. Thus, the user does not waste time selecting programs for online viewing which are not available. Aside from providing the user-specific User Menu, the system of the present invention may also interface the user with a content server for downloading or streaming a selected program from the list to the remote device for viewing. Additionally, the system may be used to update the user profile in the user's DVR after a program has been watched online. Still other features and benefits of the present invention will be clear to one of skill in the art in light of this disclosure.

Accordingly, one aspect of the invention is a system for providing a user-specific list of programs for online viewing based on a user profile stored in a DVR of a user. In one embodiment, the system comprises; (a) a preference server linked to a wide area network and in communication with the DVR and at least one content server having a library of programs available for online delivery to a remote device; and (b) the User Menu being a web site hosted by the preference server and particular to the user, providing the user-specific list of programs based on the user profile stored in the DVR. Preferably the web site is interactive to allow the user to select a desired program from the user-specific list to watch online, and then to instruct the content server to provide the program online to the user. Other embodiments could include the User Menu being customized for display on different types of remote devices possessed by the user such as mobile phones, or PDAs, according to the unique characteristics and display requirements for the device.

Another aspect of the invention is a process for providing a user specific list of programs based on a user profile stored in a DVR of a user. In one embodiment, the process comprises: (a) hosting a User Menu particular to the user, the User Menu containing a user-specific list of programs based on the user profile; (b) communicating with the DVR periodically to obtain changes to the user profile; and (c) updating the user-specific list with changes to the user profile.

DETAILED DESCRIPTION

Figure 1:
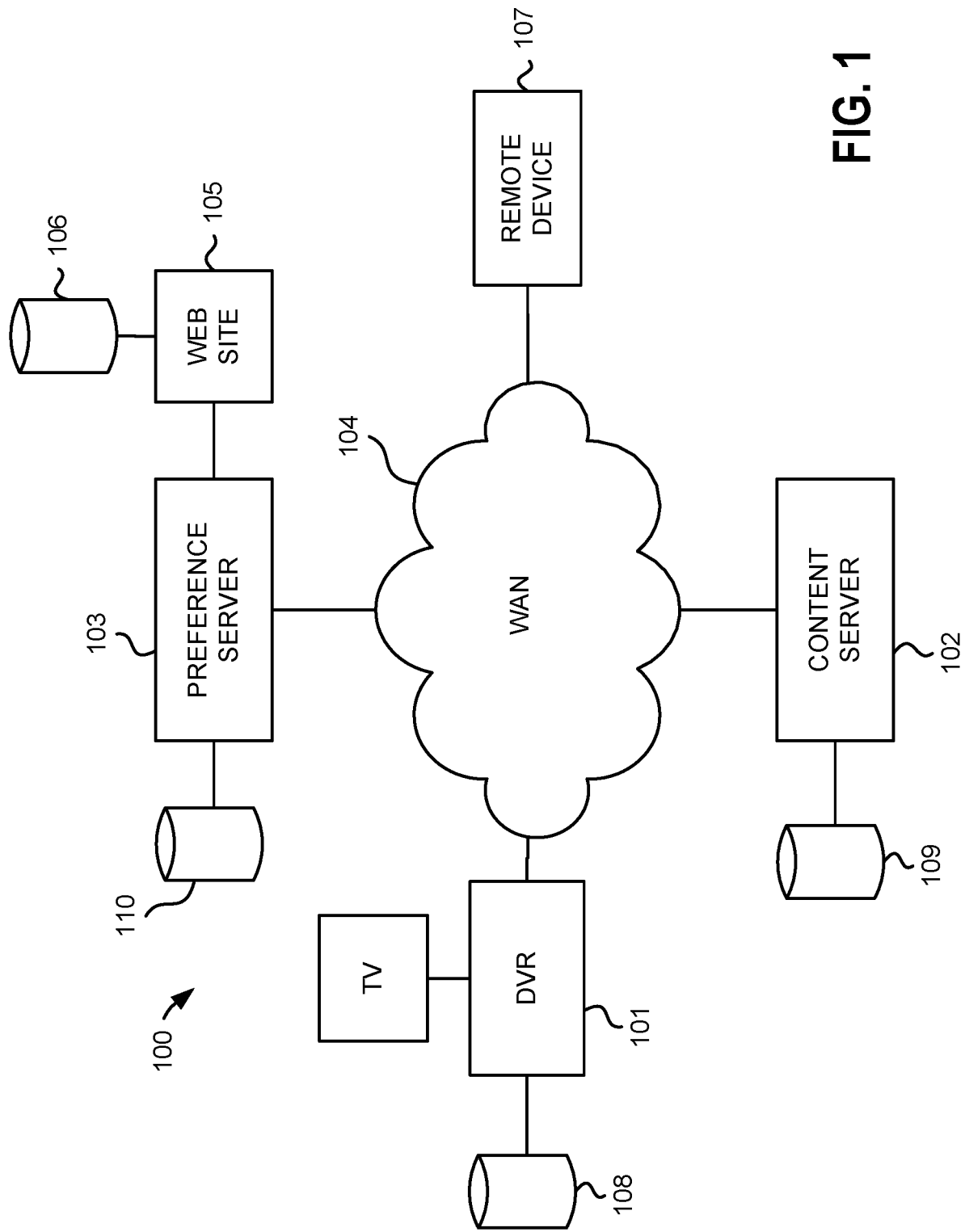
FIG. 1 is a schematic diagram of the system of the present invention.

Referring to FIG. 1, a preferred system of the present invention is shown. The system 100 provides a user with a user-specific list 106 of programs for online viewing on a remote device 107 based on a user profile 108 stored in a DVR 101 of the user. As used herein, the term "program" refers to any digital content which may be in the form of audio and/or video. Preferably, programs are video and more preferably broadcast media. The system also comprises a preference server 103 linked to a wide area network 104 and in communication with at least one DVR 101 and a content server 102. The content server 102 has a library of programs 109 available for online delivery to a remote device 107. The preference server 103 hosts a User Menu 105 particular to the user. The User Menu 105 provides the user specific list 106 of programs based on the user profile 108. Each of the elements and their operation is considered below in more detail.

The DVR may be one or more devices that can record digital content. Although the digital content is typically audio-visual, it should be understood that the present invention is not limited to audio-visual content, and may include just audio content. Furthermore, the DVR may be a virtual DVR, meaning that a physical DVR does not exist, but rather one is maintained on the Internet (or network belonging to the user's cable television, or other television/audio service provider) as if it did exist. For example, even if user does not have a DVR, he may configure his virtual DVR to indicate the programs he is interested in recording. In other words, the present invention requires a user profile of programming preferences on which to base the user-specific list. This user profile may be stored in an actual DVR or it may be created in a virtual DVR. It makes no difference to the system of the present invention.

DVRs are well known and, as mentioned above, function both to time shift and to organize digital content. With respect to organizing digital content, DVRs establish a "user profile" in the form of the metadata corresponding to the recorded programs or the programs scheduled for recording. Metadata may include the name of the program, sequence number, time recorded, network, etc. Preferably, DVRs can be programmed to record particular programs automatically, for example, record each of a series of programs (e.g., Sopranos), certain types of programs (e.g., Westerns), or discrete, one-off, programs.

In addition to these recording preferences, DVRs may also organize the digital content based on several and alternative criteria as mentioned above. For example, a DVR may list preferentially those shows not yet watched. For example, if a certain series of programs has been recorded, it may list them sequentially in the proper order to be viewed. The DVR may also list programs based on their recording date. For example, the oldest recorded shows may be listed first to prompt the user to view these programs so they can be deleted to make room for other recordings. The DVR may also function to eliminate shows that have already been watched to free up space for new programs to be recorded. Thus, the DVR provides a user profile of only those programs of interest to the user, organized in a meaningful way.

The User Menu 105 is particular to the user, meaning that, in one embodiment, every user has his own Internet site containing his own user-specific list of programs for online viewing. The user's User Menu is accessible online using the remote device(s). The User menu may be in the form of a web page, downloadable client, or some format customized for a particular device, as long as it is delivered over the Internet.

The content server 102 functions to provide digital content online to a remote device as defined above. The content server 102 may be one of a plurality of content servers monitored by the preference server 103 for providing on-line digital content as described below. Such content servers are well known and are becoming more popular. The content server contains a library 109 of available online programs. Preferably, the appropriate rights to download, stream or otherwise transmit online is secured for each of the programs in the library by the owner of the content server. Importantly, in one embodiment, the content server(s) need not be controlled by the same party providing the User Menu, but rather by one or more third parties.

Different users may possess different "entitlements" or rights to view particular content provided on particular content servers. Optionally, the preference server can interface with content servers(s) to determine the content available to a specific user by different entitlement criteria which may be specific to that user. For example, if content on a particular content server is available on a subscription basis, the preference server is able to know if a user possesses the required subscription as part of the user's profile, and can provide the availability of that content on the User Menu to that user only.

By using a content server to download the digital content, higher quality streaming is available. The content server may stream the video directly to a remote device or, alternatively, it may transmit the digital content to the preference server, which, in turn, may download the content to the remote device. Either way, since the digital content is being downloaded from a server to a remote device, it has the advantage of a broad downstream link. That is, downstream links generally have higher bandwidth than upstream links. Consequently, digital content can be streamed with higher resolution than possible with SlingBox-like devices, which as mentioned above can be limited by the upstream link from the SlingBox to the Internet server. For example, a content server can currently download streaming video at a bandwidth rate that is a multifold increase over typical SlingBox transmission rates.

The preference server functions to pull together information from at least one user DVR and at least one content server, and to display a user-specific list of programs based on this information on a User Menu that it hosts.

The preference server interacts with at least one user DVR to obtain the user profile and to update the user-specific list of programs. This update may be performed every time the user goes to the User Menu or automatically by the preference server at predetermined intervals. To this end, it may communicate with the user's DVR(s) over the Internet, or through a point-to-point connection.

Preferably, the preference server communicates with the DVR(s) over the Internet. Furthermore, if the user has more than one DVR, the preference server would communicate with each one to form a comprehensive user profile. Likewise, the preference server may form unique profiles for multiple users within a single home (i.e., common DVR). For example, when one user views an initial User Menu based on the common DVR, he can select/deselect programs particular to his preferences, and the preference server will build a sub-profile for this user for future use, but other users sharing the common DVR will not have their User Menu affected by his preferences.

The preference server also functions to interface with one or more content servers. This interface may be via the Internet or a point-to-point connection. Preferably, the interface is over the Internet. This allows the preference server to monitor different content servers and keep frack of what programs are available for download from which content servers. To this end, the preference server periodically combs the Internet for content servers and updates a content server database 110 containing locations for downloading particular programs. Alternatively, the preference server and content server can be integrated in a common computer or server.

In one embodiment, the preference server compares the user profile from one or more DVRs to the available programs in the content server database 110. The user profile then is modified such that the user-specific list of programs contains only those programs available for online viewing. Alternatively, rather than conforming the user profile of the DVR to the available programming on a content server, the preference server may instead provide the user's profile on the User Menu, but wait to determine downloading availability until after the user selects a program from the user-specific list as described below.

Preferably, the User Menu is interactive meaning that it is responsive to a user's input. For example, in a preferred embodiment, the User Menu provides the user-specific list of programs based on the user profile and allows the user to select which of those programs it would like to watch online. Once the program is selected, the preference server facilitates the download of the desired program. To this end, the preference server may instruct a particular content server having the desired digital content to download it directly to the remote device, or, alternatively to transmit the program to the preference server which then downloads it to the remote device. Alternatively, rather than the preference server managing the download of the desired program, the preference server may simply launch the user to the content server web page having the desired program so the user can manage the download of the program from that site.

The preference server may also function to update the DVR. Specifically, in addition to receiving the user profile from the user's DVR, the preference server may also function to update the user profile to reflect programs watched online. For example, the user may be given an option after watching a program online to update its user profile to reflect this. If the user chooses the option, the preference server would then communicate with the DVR and update it accordingly.

Figure 2:
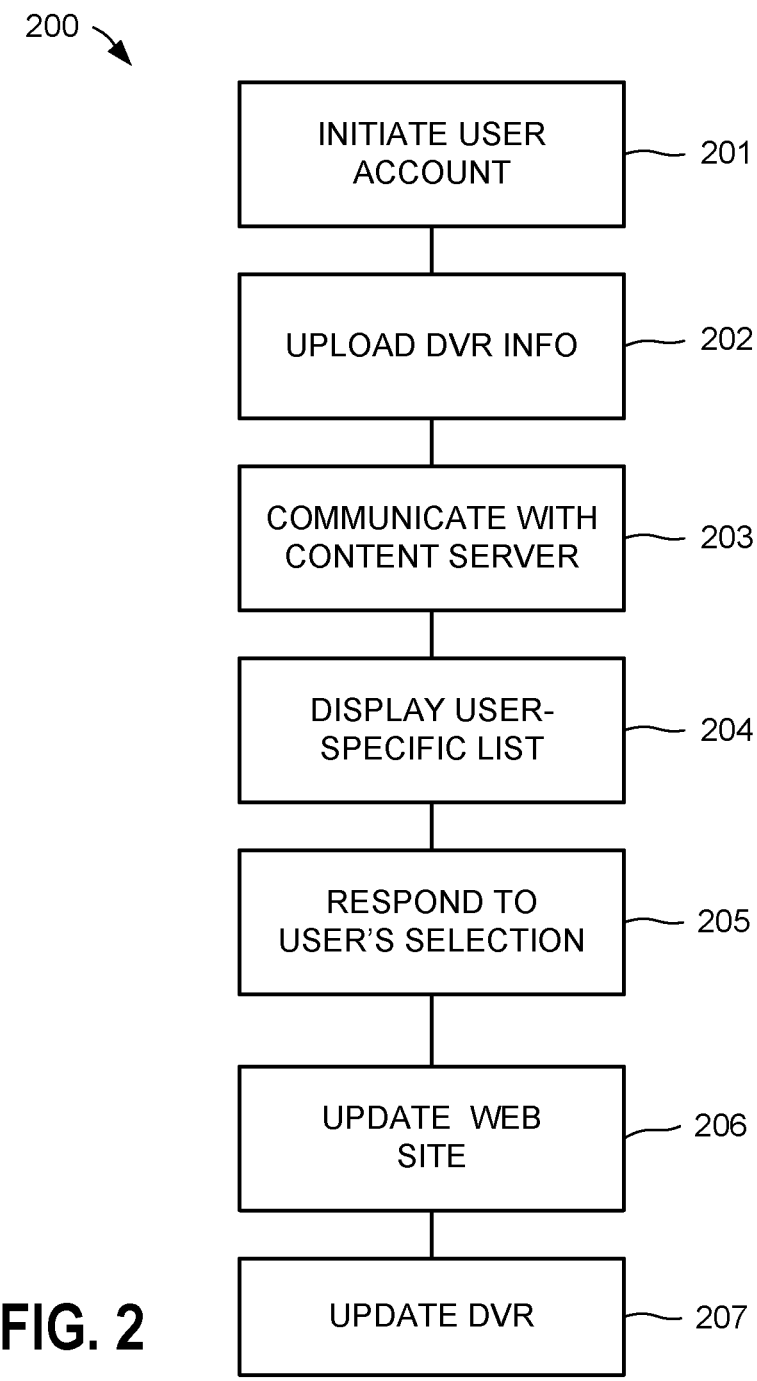
FIG. 2 is a flow chart of a process of the present invention.

In operation, the system of the present invention provides a user specific list of programs based on a user profile stored in a DVR of a user. Referring to FIG. 2, a flow chart 200 of the process is depicted. In step 1, a user account is initiated in the preference server. This involves for example, the user providing the server with personal information to allow the preference server to establish a personalized website, and to communicate with the user's DVR.

In step 202, the user profile from the user's DVR is uploaded. As mentioned above, this user profile contains a list of the recorded programs and the programs to be recorded. It may also contain information regarding the organization of the programs including particular sequences and indications of whether the programs have already been watched.

Step 203 is optional and involves the preference server communicating with one or more content servers to determine which of the programs in the user profile are available for online viewing, and then revising the profile accordingly so that a user-specific list of programs based on the user profile only contains programs which are available online.

In step 204, this user-specific list is displayed on the User Menu hosted by the preference server. Optionally, in addition to the user-specific list being based on the user profile in the DVR, it may include information gathered by the preference server based on the user profile. Specifically, the preference server may be configured to search the Internet and other data sources to deduce or infer programs of interest to the user based on the user's profile. The programming and processes allowing the preference server to be configured to perform this function have improved significantly in recent years.

As mentioned above, the User Menu is preferably interactive to allow the user to select programs to watch online from the user-specific list provided. Accordingly, in step 205, the user selects a program to watch online. At this point, the preference server may direct the content server to download the program directly to the user's remote device, or the preference server may receive the program from the content server and then download it to the user's remote device. Alternatively, the preference server may launch the user to a content server web site where the desired program is available for download. Still other download scenarios are possible. For example, the content server may transmit the program to a third party download server, specifically configured for downloading programs.

In step 206, the preference server updates the User Menu. This may involve simply contacting the DVR periodically to determine changes to the user profile. Alternatively, this step may be performed each time the user logs on to the User Menu. In yet another embodiment, this is done after the user affirmatively requests an update. Still other updating scenarios are possible.

Optionally, the system not only updates the User Menu, but also updates the user profile on the DVR. Accordingly, in step 207, the system communicates with the DVR to update the user profile to reflect any shows that may have been watched online. In this respect, the system may ask the user if the DVR should be updated or automatically update it after a selection is made from the user specific list of programs on the User Menu.

Using the system and method of the present invention as described above offers significant benefits over the prior art. For example, only programs of interest to the user are displayed on the User Menu, thus simplifying the user's choices from a sea of online viewing possibilities. In addition to listing only those programs of interest to the user, the user-specific list may impart the organizational features of the DVR. These organizational features may include, for example, prioritizing unwatched programs, listing the programs of a series sequentially, listing programs based on recording date, etc. Furthermore, optionally the system can interact with an online content server to list only those programs from the user profile that are available for online viewing. Thus, the user does not waste time selecting programs for online viewing which are not available. Aside from providing the user specific list, the system of the present invention may also interface the user with a content server for downloading a selected program from the list to the remote device. Additionally, the system may be used to update the user profile in the user's DVR after a program has been watched online. Still other features and benefits of the present invention will be clear to one of skill in the art in light of this disclosure.

It should be understood that the description above provides illustrative embodiments of the present invention and other embodiments exist.

What is claimed is:

1. A method comprising:
   receiving, by a first computing device, a first list of content items indicating content items recorded or scheduled to be recorded at one or more recording devices;
   determining a second list of content items available from at least one content server;
   comparing the first list of content items and the second list of content items to generate a subset of content items from the first list of content items and the second list of content items;
   sending, to a second computing device, information indicating the subset of content items; and
   based on information indicating that one or more content items, of the subset of content items, were output via the second computing device:
      causing output, to a user of the second computing device, of an option to automatically update the first list of content items to indicate that the one or more content items were output via the second computing device; and
      based on a selection of the option, causing, at predetermined time intervals, the one or more recording devices to update the first list of content items by causing the one or more recording devices to remove, from the first list of content items, at least one content item.

2. The method of claim 1, wherein the information indicating that the one or more content items were output via the second computing device also indicates a user who viewed the content item from the subset of content items.

3. The method of claim 1, wherein the subset of content items comprises content items that have not been output to a user of the second computing device.

4. The method of claim 1, wherein the one or more recording devices are configured to periodically identify changes to the first list of content items.

5. The method of claim 1, further comprising sending, to the second computing device, further information indicating additional content items based on rights of a user of the second computing device to view the additional content items.

6. The method of claim 1, further comprising:
   receiving, from the second computing device, a selection of a content item indicated in the subset of content items; and
   causing the at least one content server to deliver the selected content item to the second computing device.

7. The method of claim 1, further comprising:
   organizing the subset by prioritizing content items that have not been output.

8. The method of claim 1, wherein the one or more recording devices comprises a digital video recorder (DVR), and the subset of content items comprises at least one content item scheduled to be recorded by the DVR.

9. The method of claim 1, wherein the causing output of the option to automatically update the first list comprises causing display of a user menu, corresponding to the one or more recording devices, via the second computing device.

10. The method of claim 1, wherein the first list comprises content items recorded at a plurality of digital video recorders associated with a user of the second computing device.

11. An apparatus comprising:
   one or more processors; and
   memory storing instructions that, when executed by the one or more processors, cause the apparatus to:
      receive a first list of content items indicating content items recorded or scheduled to be recorded at one or more recording devices;
      determine a second list of content items available from at least one content server;
      compare the first list of content items and the second list of content items to generate a subset of content items from the first list of content items and the second list of content items;
      send, to a computing device, information indicating the subset of content items; and
      based on information indicating that one or more content items, of the subset of content items, were output via the computing device:
         cause output, to a user of the computing device of an option to automatically update the first list of content items to indicate that the one or more content items were output via the computing device; and
         based on a selection of the option cause, at predetermined time intervals, the one or more recording devices to update the first list of content items by causing the one or more recording devices to remove, from the first list of content items, at least one content item.

12. The apparatus of claim 11, wherein the information indicating that the one or more content items were output via the computing device also indicates a user who viewed the content item from the subset of content items.

13. The apparatus of claim 11, wherein the subset of content items comprises content items that have not been output to a user of the computing device.

14. The apparatus of claim 11, wherein the
one or more recording devices are configured to periodically identify changes to the first list of content items.

15. The apparatus of claim 11, wherein the instructions, when executed by the one or more processors, further cause the apparatus to:
send, to the computing device, further information indicating additional content items based on rights of a user of the computing device to view the additional content items.

16. The apparatus of claim 11, wherein the instructions, when executed by the one or more processors, further cause the apparatus to:
receive, from the computing device, a selection of a content item indicated in the subset of content items; and
cause the at least one content server to deliver the selected content item to the computing device.

17. The apparatus of claim 11, wherein the instructions, when executed by the one or more processors, further cause the apparatus to:
organize the subset by prioritizing content items that have not been output.

18. A non-transitory computer readable medium storing instructions that, when executed, cause:
receiving a first list of content items indicating content items recorded or scheduled to be recorded at one or more recording devices;
determining a second list of content items available from at least one content server;
comparing the first list of content items and the second list of content items to generate a subset of content items from the first list of content items and the second list of content items;
sending, to a computing device, information indicating the subset of content items; and
based on information indicating that one or more content items, of the subset of content items, were output via the computing device:
causing output, to a user of the computing device, of an option to automatically update the first list of content items to indicate that the one or more content items were output via the computing device; and
based on a selection of the option, causing, at predetermined time intervals, the one or more recording devices to update the first list of content items by causing the one or more recording devices to remove, from the first list of content items, at least one content item.

19. The non-transitory computer readable medium of claim 18, wherein the information indicating that the one or more content items were output via the computing device also indicates a user who viewed the content item from the subset of content items.

20. The non-transitory computer readable medium of claim 18, wherein the subset of content items comprises content items that have not been output to a user of the computing device.

21. The non-transitory computer readable medium of claim 18, wherein
the one or more recording devices are configured to periodically identify changes to the first list of content items.

22. The non-transitory computer readable medium of claim 18, wherein the instructions, when executed, further cause:
sending, to the computing device, further information indicating additional content items based on rights of a user of the computing device to view the additional content items.

23. The non-transitory computer readable medium of claim 18, wherein the instructions, when executed, further cause:
receiving, from the computing device, a selection of a content item indicated in the subset of content items; and
causing the at least one content server to deliver the selected content item to the computing device.

* * * * *